United States Patent [19]

Zachariades

[11] Patent Number: 4,820,466
[45] Date of Patent: Apr. 11, 1989

[54] PROCESS FOR OBTAINING ULTRA-HIGH MODULUS PRODUCTS

[76] Inventor: Anagnostis E. Zachariades, 65 Glengarry Way, Hillsborough, Calif. 94010

[21] Appl. No.: 6,008

[22] Filed: Jan. 22, 1987

Related U.S. Application Data

[63] Continuation-in-part of Ser. No. 877,896, Jun. 24, 1986, abandoned, which is a continuation-in-part of Ser. No. 697,211, Jan. 31, 1985, abandoned, which is a continuation-in-part of Ser. No. 578,171, Feb. 8, 1984, abandoned.

[51] Int. Cl.$^4$ ............................................. B29C 59/04
[52] U.S. Cl. .................................... 264/119; 264/120; 264/146; 264/280; 264/294; 264/323; 419/3; 419/69; 425/382.3
[58] Field of Search ................. 264/40.7, 119, 120, 264/280, 284, 288.4, 291, 293, 294, 310, 320, 322, 323, 146, 109; 425/376 B; 419/3, 5, 43, 67, 69

[56] References Cited

U.S. PATENT DOCUMENTS

| | | | |
|---|---|---|---|
| 2,476,830 | 7/1949 | Spencer | 264/322 X |
| 2,904,829 | 9/1959 | Heck | 419/43 |
| 2,994,917 | 8/1961 | Fritsch | 264/120 X |
| 3,083,410 | 4/1963 | McGlamery | 264/280 |
| 3,123,656 | 3/1964 | Rochlin | 264/146 X |
| 3,389,993 | 6/1968 | Lund et al. | 419/43 |
| 3,546,769 | 12/1970 | Schwope et al. | 264/DIG. 19 |
| 4,085,187 | 4/1978 | Jenks et al. | 264/280 |
| 4,138,453 | 2/1979 | Segl | 264/22 |
| 4,436,682 | 3/1984 | Knopp | 264/70 |

FOREIGN PATENT DOCUMENTS 1004457 3/1954 Fed. Rep. of Germany ........ 419/43

OTHER PUBLICATIONS

Knopp, "Principles and Variables Involved in Roll Compacting of Powders", Progress in Powder Metallurgy 1981, vol. 37, pp. 321-327.

"Production of Thin Metal Strip by Powder Rolling", by David H. Ro and Milton W. Toaz; National SAMPE Meeting Proceeding of Apr. 12-14, 1983; (Society for the Advancement of Materials and Process Engineering).

*Primary Examiner*—Jan H. Silbaugh
*Assistant Examiner*—Mary Lynn Fertig
*Attorney, Agent, or Firm*—Owen, Wickersham & Erickson

[57] ABSTRACT

Method and apparatus for producing high modulus products. A polymer morphology or powdered metal is solid-state deformed under pressure through the rollers of an extrusion rolling die, at a temperature near but below its crystalline melting point, while controlling the extrusion rate and the rate of rotation of the rollers so that the rate of extrusion of the polymer or metal is substantially the same as the rate of rotation of the rolling die surface.

14 Claims, 5 Drawing Sheets

PROCESS FOR OBTAINING ULTRA-HIGH MODULUS PRODUCTS

REFERENCE TO RELATED APPLICATION

This application is a continuation-in-part of application Ser. No. 877,896 filed June 24, 1986, now abandoned, which was a continuation-in-part of application Ser. No. 697,211, filed Jan. 31, 1985, now abandoned, which was a continuation-in-part of application Ser. No. 578,171 filed Feb. 8, 1984, now abandoned.

FIELD OF INVENTION

This invention relates to a solid-state deformation process and apparatus for achieving the production of ultra-high modulus polymers of both simple and complex shapes, at rapid output rates and under moderate processing conditions.

BACKGROUND OF THE INVENTION

The development of ultra-high modulus polymers has been pursued in many academic and industrial laboratories by the preparation of anisotropic polymer morphologies of highly oriented and extended molecular chains.

It has been known for a long time that the theoretical tensile modulus of a polymer should approach the modulus of steel ($\sim$208 GPa). However, until a decade ago, the theoretical calculations (for polyethylene $\sim$240 GPa) were considered unlikely to be achieved, because all known polymers had moduli two orders of magnitude lower The reason for such a low modulus was that the polymer assumed a random entangled and twisted configuration which had a low load bearing capacity. In recent years, it was realized that the greatest modulus and strength would result from an anisotropic structure of highly oriented, extended, and densely packed chains. Indeed, some polymers, for example polybenzamide and polyethylene, have been processed into fibers that exhibit moduli of 100-200 GPa, thereby indicating that the earlier theoretical values can be approached.

The development of ultra-high modulus products is of paramount importance in view of their significantly lower density; for example, steel is about eight times more dense than polyethylene. The term "specific modulus" refers to the quotient of modulus divided by density; therefor the specific modulus of polyethylene ultra-high modulus fibers is significantly higher than the specific modulus of steel.

Conventional flexible chain polymers, e.g., polyethylene have been processed into high modulus products by processes that may cause a permanent deformation of the internal structure, namely, the conversion of an initially isotropic and spherulitic structure to a fibrillar structure. The fibrils are made of oriented and extended molecular chains which ensure mechanical connection between crystals and load transfer.

Thus, it can be realized that, for maximum mechanical performance, all polymer chains should be extended along the deformation direction. Thus macroscopic deformation, which involves molecular deformation and is accompanied by drastic dimensional changes in the case of flexible polymers, should not be confused with the shaping processes which in general are also accompanied by dimensional changes but do not involve the transformations of a spherulitic to a fibrillar morphology, which, in the case of high density polyethylene, takes place at a deformation ratio of approximately 4. Nor should macroscopic deformation be confused with the conventional melt extrusion process which may involve some molecular orientation. Indeed, during any melt processing operation some molecular orientation is bound to occur because of the viscoelastic nature of polymeric materials. However, the fraction of extended chains is exceedingly small, too small to result in high modulus/strength performance.

Furthermore, the macroscopic deformation described in this specification is not confined, as to deformation limits, to the natural draw of a particular polymer, for such limits can be overcome by the process of the present invention.

Shaping processes such as calendering or rolling are small deformation processes which do not result in morphological transformation necessary for the ultra-high modulus and strength performance and almost unequivocally involve biaxial flow, i.e., deformation in both the longitudinal (machine) and the transverse direction. Rolling combined with stretching may result in uniaxially deformed polymer structures with significantly enhanced tensile properties. However, this technology is confined to the processing of thin sheets and is limited by the excessive loads involved to offset the counter-force and the friction between the roll and the polymer surface.

Anisotropic polymer morphologies with ultrahigh modulus and strength have been obtained by processing conventional flexible chain polymers by solid state deformation using the extrusion and drawing techniques, by extrusion of supercooled melts and by drawing from gels and dilute flowing solutions.

Various semicrystalline polymers have been studied. High-density polyethylene has been studied the most because of its simple composition and its high theoretical modulus (approximately 240 GPa). Similar anisotropic morphologies have been obtained by the chemical construction of polymers with rigid and semirigid backbone chains by introducing para-substituted aromatic units and then processing with solution and melt processes. The para-benzamide polymers and the copolyesters of poly(ethylene terephthalate) and p-acetoxybenzoic acid are examples of rigid and semi-rigid polymers sought to be processed into ultra-high modulus products, i.e., products in which the molecules are not only oriented but are also extended.

Typically, the ultra-high modulus products from the above processes have been in the form of fibers and thin films, that is, structures which do not have bulk mechanical properties. Two recent developments of ultra-high modulus products with bulk structure have been obtained by injection molding of high density polyethylene and the copolyester of poly(ethyleneterephthalate) and p-acetoxybenzoic acid.

The solid-state extrusion process has also been investigated for its potential use for the production of ultra-high modulus products with bulk structure, but it has been severely restricted by low processing rates (a few centimeters per minute), for it is a solid-state deformation process through a convergent geometry. It has also required very high extrusion pressures, especially for the preparation of products with complex or large cross-sectional areas. An analysis of the extrusion process shows that a high extrusion pressure is required (a) to shear and elongate the polymer and (b) to overcome the die-polymer friction. Equation (1) shows the pressure balance in the solid-state extrusion process through a conical die:

$$P_E + e^{(B\epsilon_0)}P_0 = e^{(B\epsilon_0)}[\int_0^{\epsilon_0} \sigma(\epsilon)d\epsilon + \sigma(\epsilon_0) + S(\epsilon_0, a)] \quad (1)$$

where $P_E$ is the pressure of extrusion,
$P_0$ is the pressure at the die exit,
B is $\mu\cot[a]$,
$\mu$ is the friction coefficient,
a is the die half angle,
$\epsilon$ is the strain,
$\epsilon_0$ is the strain at the exit of the die,
$\sigma(\epsilon)$ is the true stress at strain $\epsilon$,
S is the work of shear and shear yield at strain $\epsilon_0$ and die angle a.

Equation (1) indicates that the friction coefficient term B is significant and that extrusion pressure increases with increasing friction.

SUMMARY OF THE INVENTION

The invention comprises a method for producing high modulus products and includes solid-state deforming a polymer morphology under pressure through the convergent geometry of the rollers of an extrusion rolling die in which the polymer is confined over the entire perimeter by the moving surface of the die during the deformation process. This is done, at a temperature near but below its crystalline melting point, while controlling the extrusion rate and the rate of rotation of the rollers so that the rate of extrusion of the polymer is substantially the same as the rate of rotation of the rolling die surface. This is not a two-stage process with an extrusion and then a rolling. The extrusion-rolling die used in this invention is a one piece apparatus in which the polymer is extruded, not rolled, through the simple or complex conduit geometry. The process is to be contrasted with conventional calendering or rolling, in which lateral deformation perpendicular to the machine direction may occur. In the present invention no lateral deformation is permitted.

The invention also includes an extrusion rolling die for producing high modulus polymer products. This apparatus comprises a pair of rotatable rollers which are kept at a temperature near but below the crystalline melting point of the polymer to be processed. There are force-applying means for applying extrusion pressure to the feed zone of the rollers and control means for controlling the rate of rotation of the rollers so that the rate of extrusion of the polymer is substantially the same as the rate of rotation of the rolling die surface.

In accordance with the present invention, a high modulus product such as a high density polyethylene is produced by a solid-state deformation technique at rapid output rates and in shapes of different complexity. Such a high modulus is produced by deforming the polymer preferably near to, but below its crystalline melting point through an extrusion rolling die.

The extrusion rolling die is a key feature in this invention and is composed of a feed zone reservoir adjacent to a set of master rollers on which cylindrical sleeves of different diameters and/or shapes can be mounted to result in converging geometries of different configurations with moving wall elements. This type of die design is distinctly different from the dies used in solid state extrusion and the die-or-zone-drawing processes which are static and use converging conical or tapered slit dies with no moving wall elements.

The extrusion rolling die of this invention has an exponential profile or trumpet shape and therefore has the advantage of trumpet-shape dies for extrusion at lower strains, and consequently it results in lower extrusion pressures since the pressure increases with the strain and the strain drops rapidly with die-half angle. According to this invention the motion of the roller elements of the extrusion rolling die and the polymer between them is substantially synchronous and thus may result in a process in which the friction between the polymer and the die surface is minimized and consequently the extrusion pressure is reduced. The kind of synchronous motion of the rollers and the polymer under extrusion conditions may be considered analogous to a substrate drawing process. This can be demonstrated in a co-extrusion experiment wherein the material to be deformed is sandwiched between two substrate layers, and the entire structure is then co-extruded through a convergent die geometry. In this configuration, the material between the two substrates (e.g., a polyethylene film between two polyethylene substrates) is deformed under compression and without friction on the surrounding substrates, as long as the extrusion rates of the substrates and the material in the middle are the same. An additional advantage of the reduction of friction between the polymer die surfaces by the synchronous motion of the rollers and the polymer, is that the polymer is deformed under elongational flow conditions in comparison to the shear flow conditions which prevail in conventional solid state extrusion. It has been suggested that elongation flow is beneficial for the achievement of ultra-high modulus products.

Also, the extrusion rolling process is different from the calendering process which is typically a shaping process between parallel rollers and is accompanied by dimensional changes in two directions. The designing of converging geometries between the roller elements of the extrusion rolling die in this invention imposes lateral constraints during extrusion and results in uniaxially drawn products.

The invention applies to the manufacture of various shapes, including tubes.

The method applies to semicrystalline polymers and thermotropic aromatic copolyesters.

Suitable semicrystalline polymers include polyethylene, polypropylene, polyamides, polyoxymethylene, poly(ethylene terephthalate), poly(vinylidene fluoride) and polymethylpentene. Suitable thermotropic aromatic copolyesters include

(1)

where

R is , or

-continued where

DESCRIPTION OF SOME PREFERRED EMBODIMENTS OF THE INVENTION

Figure 1:
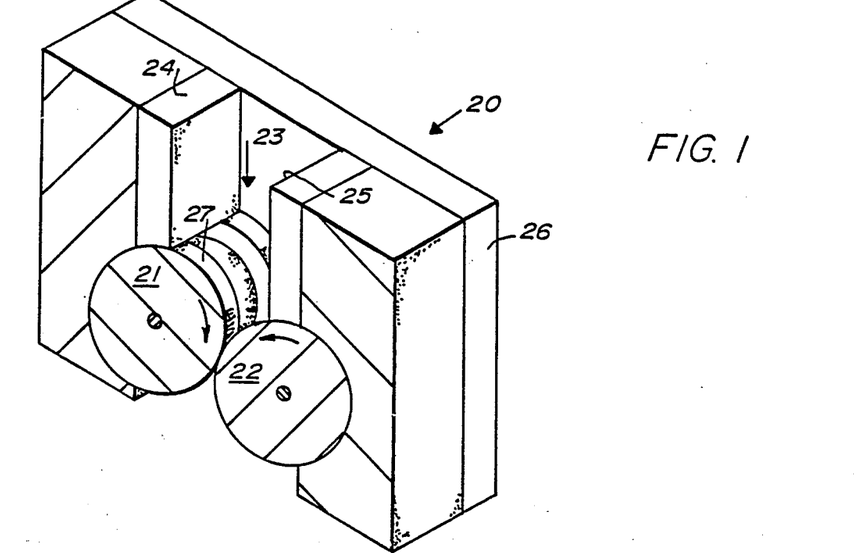
FIG. 1 is a simplified and somewhat diagrammatic isometric view in section of an extrusion rolling die with a preceding feed zone reservoir, for use in an embodiment of the invention.

As shown in FIG. 1, an extrusion rolling die 20 may include a pair of master rollers 21 and 22 which receive the polymer under pressure on their input side from a feed zone 23 having parallel side walls 24 and 25, a rear wall 26, and a front wall (not shown due to the section).

Figures 2, 3, 4:
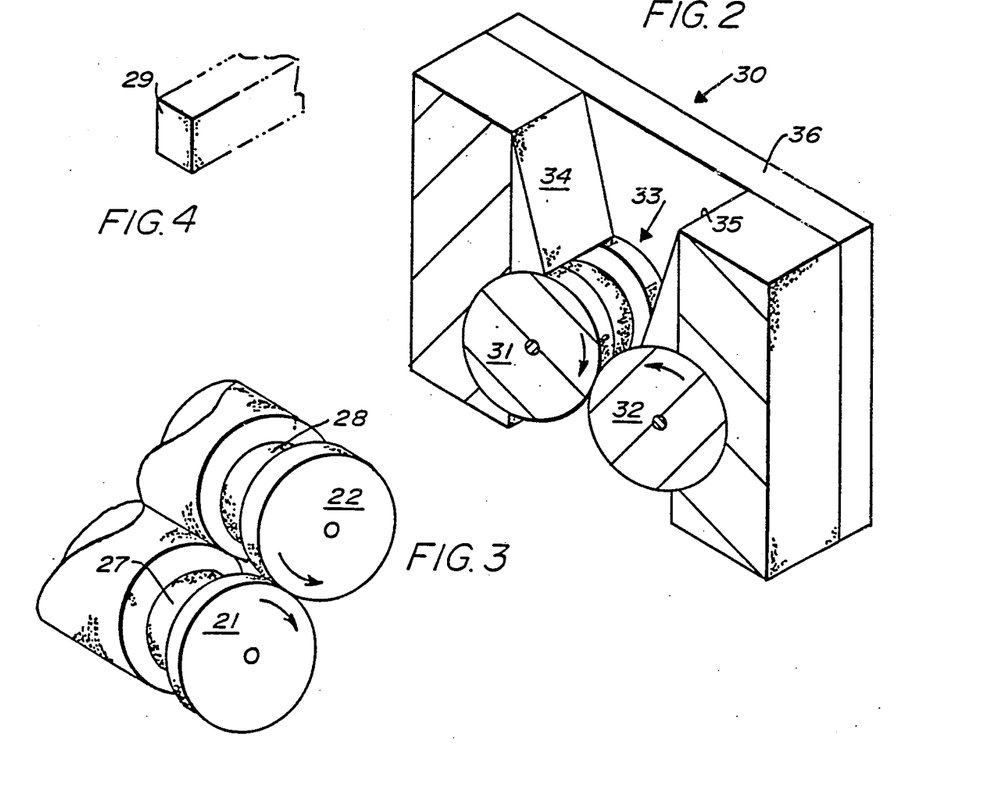
FIG. 2 is a similar view of a modified form of die and feed zone reservoir.
FIG. 3 is a fragmentary isometric view of an extrusion rolling die, showing one shape usable in practicing the invention.
FIG. 4 is a fragmentary end view in perspective of the shape of the polymer extruded from the die of FIG. 3.

FIG. 2 shows an alternative type of die 30 having master rollers 31 and 32 receiving polymer under pressure from a feed zone 33 having converging side walls 34 and 35, as well as a front wall (not shown) and a rear wall 36.

The master rollers may be shaped (or mounted with cylindrical sleeves of different diameters) to give products of any desired degree of complexity. For example, the rollers 21 and 22 are shown in FIG. 3 as provided with extrusion channels 27 and 28 that produce an extrudate 29 that is square in cross section, as shown in FIG. 4.

Figure 5:
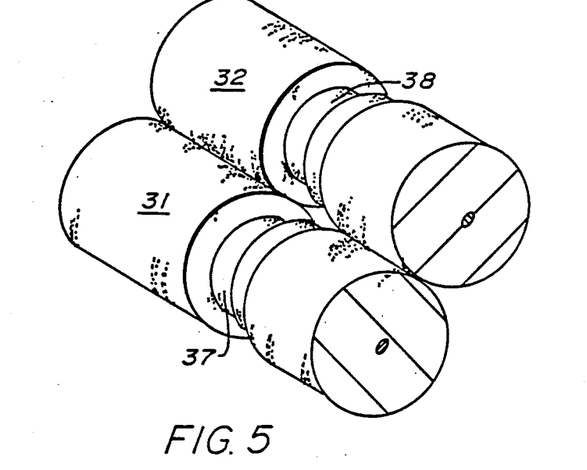
FIG. 5 is a view like FIG. 3 showing a die of a different shape.
Figure 6:
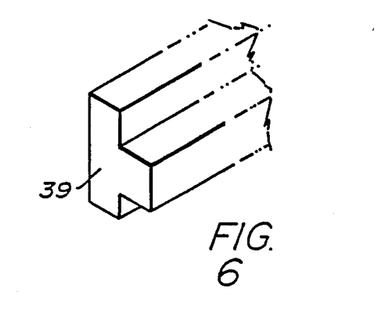
FIG. 6 is a view like FIG. 4 showing the shape of the polymer extruded from the die of FIG. 5.

On the other hand, the rollers 31 and 32 are shown in FIG. 5 to have channels 37 and 38 that produce an extrudate 39 (FIG. 6) which has a tee shape in cross section.

Figure 7:
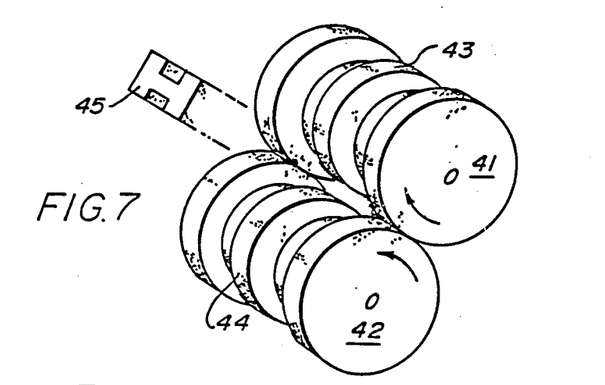
FIG. 7 is a diagrammatic isometric view of still another extrusion rolling die usable in the present invention producing a differently shaped polymer extrusion.

Further, FIG. 7 shows a pair of master rollers 41 and 42 having extrusion channels 43 and 44 shaped to produce an extrudate 45 that has the cross-sectional shape of an H.

Thus the roller (or cylindrical sleeves on them as in FIG. 11 et seq) can form converging dies of different geometries through which a polymer can be deformed in different shapes and in different sizes. The rollers of each of these extrusion dies act to confine the material within them, no movement widthwise is permitted. The rollers may be viewed as the convergent landing surfaces of the die, even through these landings surface can move synchronously with the solid polymer and do so in order to minimize friction.

Figure 10:
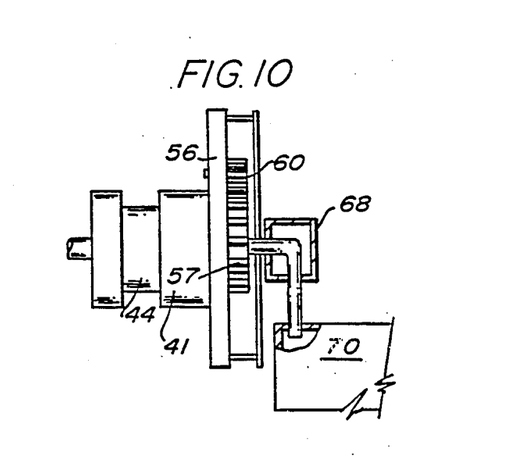
FIG. 10 is a view in side elevation of the back plate portion of the die.
Figure 11:
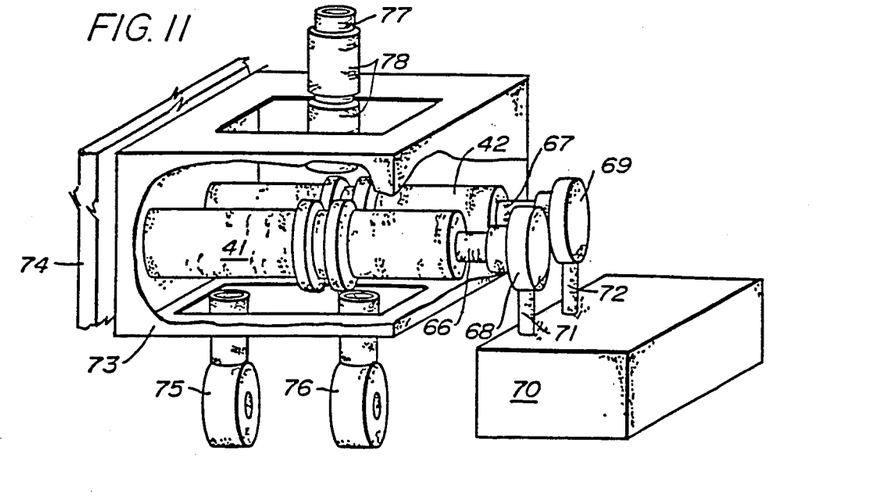
FIG. 11 is a more complete isometric view of a rolling die like that of FIG. 8 incorporated into a thermally insulated housing and provided with heaters.

As shown in FIGS. 10 and 11 and described below, the rollers 41 and 42 can be heated over a wide range of temperature conditions so that the polymer can be deformed at a temperature preferably near to but below its melting point.

The extent of deformation is determined by the deformation ratio, which is defined as the ratio of the cross-sectional area of the entrance of the feed zone to the cross-sectional area of the product extrudate. To achieve the transformation from a spherulitic to a fibrillar morphology, a deformation ratio of at least 4 is required for polyethylene.

Figure 8:
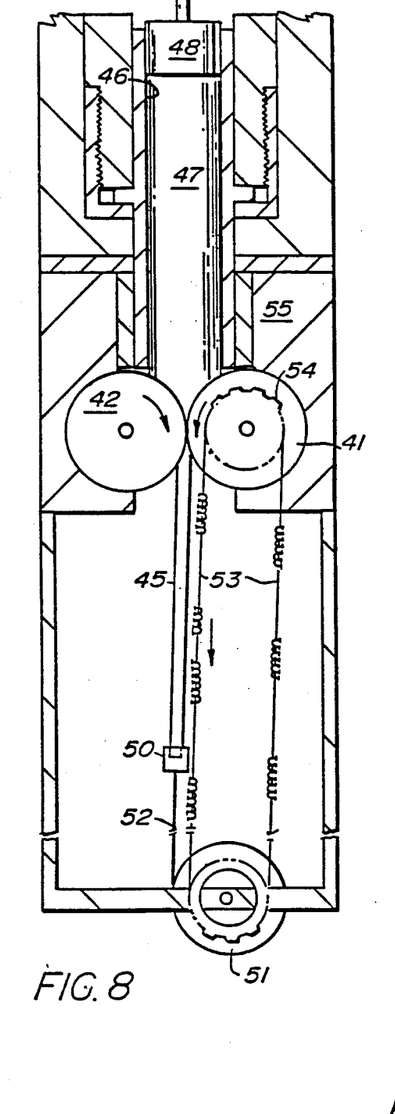
FIG. 8 is a diagrammatic view in side elevation and in more detail of the die of FIG. 7 and associated apparatus, illustrating the use of both extrusion pressure on the input side of the die and a pulling load on the output side of the die.

The polymer can be deformed by this process either under extrusion pressure alone (FIGS. 1-6), or a combined extrusion pressure and a pulling load on the emerging extrudate, as shown in FIGS. 7–10. In FIG. 8, the rollers 41 and 42 are preceeded by a feeding zone 46 filled with polymer 47, against which a hydraulic piston 48 acts to provide extrusion pressure. Simultaneously the extrudate 45 is attached to a clamping block 50 to which a pulling load is attached by a pulley wheel 51 and a wire or cable 52, which winds around the wheel 51. A continuous chain 53 links the wheel 51 and its pulling cable 52 to a pulley portion 54 on the roller 41, so that the angular velocity of the rollers 41 and 42 and the speeds of pulling and extrusion are coordinated. The rollers 41 and 42 are supported by a frame 55. Thus, the deformation process can occur under conditions of minimum friction. This is another key feature of this invention and can be achieved by adjusting the angular velocity of the rollers 41 and 42, the throughput rate, and/or the pulling rate on the emerging extrudate 45, so that the polymer and the rolling die surface move at the same velocity.

Figure 9:
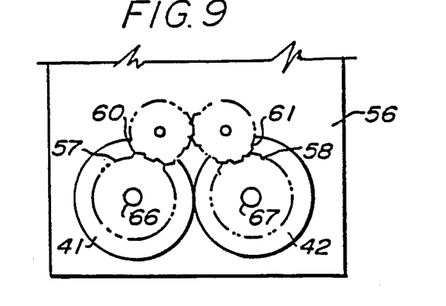
FIG. 9 is a view in elevation of the back plate thereof.

As shown in FIGS. 9 and 10, the two rollers 41 and 42 are geared together near a back plate 56 of the frame 55. The back plate 56 supports the rollers 41 and 42, on which gears 57 and 58 are mounted coaxially with the rollers 41 and 42. Two other gears 60 and 61 are meshed together, the gear 60 being in mesh with the gears 57 and 61 and the gear 61 being in mesh with the gear 58, so that the two rollers 41 and 42 rotate at exactly the same angular velocity.

FIGS. 9 and 10 also show rotary conduits 66 and 67 in the rollers 41 and 42 are joined by conduits 71 and 72 and rotary unions 68 and 69 (see FIG. 11) to a temperature-controlled oil bath 70 having a heater (not shown) Thus, as shown in FIGS. 10 the processing temperature may be attained by circulating hot oil through the master rollers 41 and 42 from a hot silicone oil bath 70, thermostated at the desired temperature.

FIG. 11 shows a slightly different configuration. The rollers 41 and 42 are again provided with conduits 66 and 67 leading to rotary unions 68 and 69, which are connected to a hot oil bath 70 by conduits 71 and 72. Here, the rollers 41 and 42 are also shown inside a chamber 73 comprising thermal insulation 74 on all sides and provided at the bottom with hot air blowers 75 and 76 to supplement the hot oil bath by air convection in the thermally insulated chamber 73 surrounding the rolling die 40, and supply additional heat, although either heat source could be used alone. Also the heating may be partly obtained by preheating the polymer stock in a reservoir 77 with electrical band heaters 78 mounted around the reservoir 77 and at the entrance of the extrusion rolling die 40.

The solid state deformation through extrusion rolling dies can be used with various semicrystalline polymers such as polypropylene and polyamides to obtain also products with enhanced bulk properties,—not just thin films as have been produced by rolling combined with stretching, or fibers, which are obtained by fiber-spinning operations. This has been demonstrated by the preparation of high-density polyethylene extrudates with circular and square cross sections at different deformation ratios.

Figure 12:
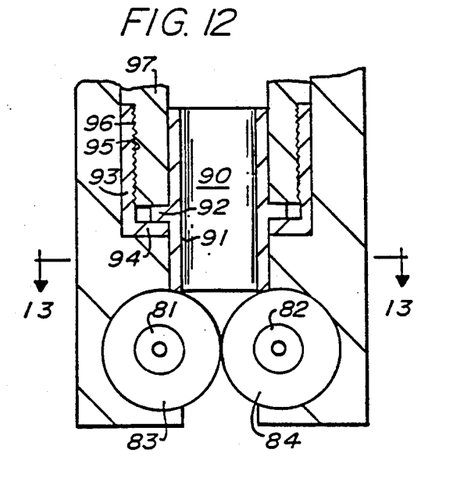
FIG. 12 is a view in elevation and in section of a modified form of rolling die also embodying the principles of this invention, which can be used in the apparatus of FIG. 11 to replace the rolling die of FIG. 8.
Figure 13:
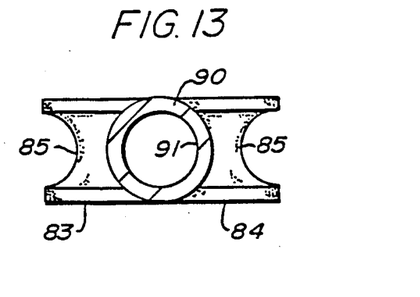
FIG. 13 is a fragmentary view in section taken along the line 13—13 in FIG. 12.
Figure 14:
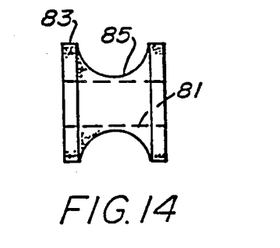
FIG. 14 is a view in elevation at right angles to FIG. 12, showing one master roller and one cylindrical sleeve thereon.

FIGS. 12–14 show an alternative structure of a rolling die 80. Here, there are master rollers 81 and 82, which are cylindrical and preferably hollow for circulation of heated liquid within them. Instead of being directly machined, the master rollers 81 and 82 are splined to respective cylindrical sleeves 83 and 84, each having a semicircular outer periphery 85 as seen in crosssection (FIG. 14). The sleeves 83 and 84 may be replaced, as shown in FIGS. 15–17 with otherwise shaped sleeves, such as sleeves 86 and 87 having a rectangular cross-sectional shape.

The feeding apparatus in FIGS. 12 and 13 comprises a cylindrical tube 90 with an inner circular cylindrical passage 91 and an exterior circular flange 92. A fitting 93 is cylindrical with a bottom, inwardly extending flange 94 and an interior thread 95 (FIG. 12), into which is threaded the exterior thread 96 of a conduit 97.

Figure 15:
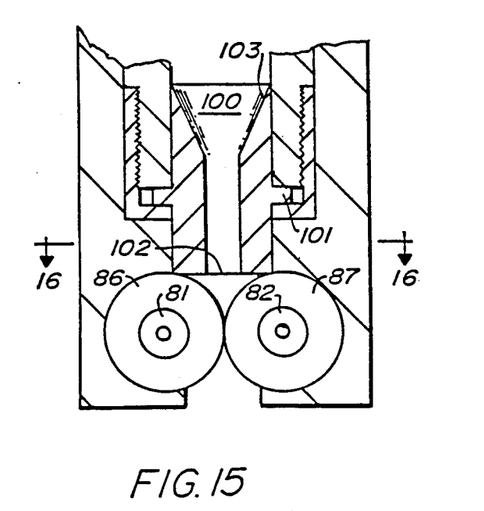
FIG. 15 is a view like FIG. 12 of another modified form of rolling die.
Figure 16:
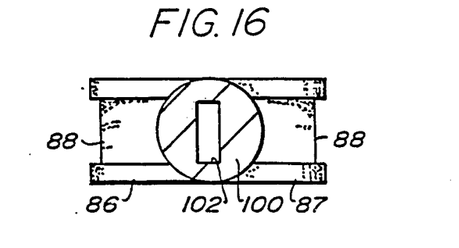
FIG. 16 is a fragmentary view in section taken along the line 16—16 in FIG. 15.
Figure 17:
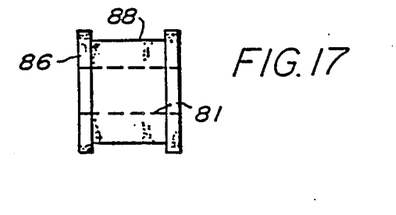
FIG. 17 is a view like FIG. 14 of a portion of FIG. 15.

The feeding apparatus of FIGS. 15 and 16 is similar except that is has a tube 100 with an exterior flange 101 and an interior passage having a lower square portion 102 and an upper conical portion 103.

In a typical experiment, an extrusion rolling die generally like that shown in FIGS. 7–10 incorporated a series of juxtaposed cylindrical sleeves of different diameters and widths, as shown in FIGS. 12–17, to result in both circular and square cavities between the rollers of progressively smaller cross sectional areas. These circular and square cavities between the rollers part of the extrusion die are in sharp contrast to the open-ended slit between conventional rollers. It is important to note that in the present invention the polymer is completely confined widthwise. The sleeves on the master rollers were heated to 125°–130° C. by convection in a thermally insulated chamber. Preformed samples having circular or square cross-section, according to which cavities they were to be fed, were placed into the die, and after thermal equilibration, each sample was pulled through the die by a pulling load. Minimum friction requirements were met by synchronizing the rate of the pulling load and the rotation of the rollers using the pulley system and gears in FIGS. 8 to 10. To commence the extrusion through the extrusion rolling die, the end of the initial stock was trimmed to an area slightly smaller than the cross-sectional area between the rollers so that it could be fed through the rollers section of the die and gripped by the clamping block 50 as in FIG. 8.

Transparent extrudates of deformation ratio 12 were obtained by applying a pulling load of 25 MPa.

Figure 18:
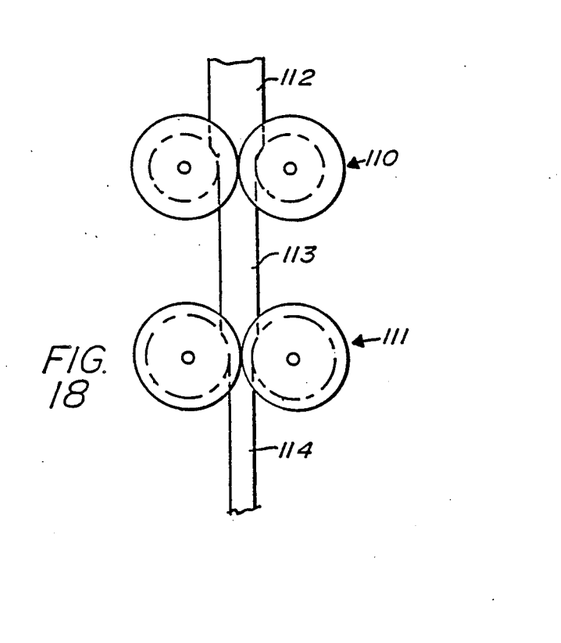
FIG. 18 is a diagrammatic view showing two rolling dies of the invention in series.

Additional compaction and drawing can be obtained by use of a plurality or series of rolling dies, as shown in FIG. 18, where rolling dies 110 and 111 are in series and the polymer 112 is first subjected to the die 110 and its extrudate 113 is then subjected to the die 111 to produce an extrudate 114.

In another set of experiments, polyethylene was extruded under the combined effects of an extrusion pressure and a pulling load. The polyethylene was crystallized in a reservoir and, after reaching thermal equilibration at 130° C. was extruded initially through a straight conical die (a=20°) of deformation ratio 2 and under an extrusion pressure of less than 50 MPa. The straight conical die was in close proximity to the extrusion rollers, to serve as the feed zone 46 of the extrusion rolling die shown in FIG. 8. The emerging extrudate 45 from the straight conical die was pulled through the extrusion rollers by adjusting the rate of pulling and the rotation of the rollers 41 and 42 to meet the minimum friction requirements as described previously.

In an independent experiment, when an attempt was made to pull a polyethylene sample between two freely rotating rolls to a draw ratio of $\gtrsim 10$, the polymer slipped on the rolls and deformed by a necking process similar to a drawing process or to what is encountered in a simple tensile test. The situation can be aggravated when the cross-sectional area of the initial stock polymer is large.

The extrudates under both conditions of experimentation were transparent. Transparency of such extruded samples arises from an increase in crystal size and concentration and, most importantly, from the crystalline orientation and the dense packing of the polymer chains which are produced by extruding through a contained geometry under the compression conditions in the extrusion rolling die. When the pulling rate on the emerging extrudate is higher than the rate of extrusion rollers, post necking may occur beyond the exit of the die and result in translucent extrudates. Such loss of transparency is associated with the formation of voids during the drawing process and beyond the die exit; these are known to occur in conventional solid-state drawing of high-density polyethylene. The variation of output speed with the pulling load and an extrusion pressure of 5-10 MPa is summarized in Table 1. The deformation ratios, the Young's modulus and the tensile strength of the extrudates are included also.

TABLE 1

| Pulling Load (MPa) | Output Speed Ratios (m/min) | Deformation Modulus | Young's Strength (GPa) | Tensile (MPa) |
| --- | --- | --- | --- | --- |
| 4.4 | 2 | 5 | 2.5 | 180 |
| 10.6 | 2 | 8 | 5 | 260 |
| 16 | 2-3 | 10 | 8 | 260 |
| 24 | 3-5 | 12 | 10 | 320 |

Yet, in another experiment, a melt crystallized morphology of ultra-high molecular weight polyethylene, i.e., a polyethylene with molecular weight of $\sim 2-8 \times 10^6$, has been extrudo-rolled into ribbon and rod products of DR 5-8 with a Young's modulus of $\sim 10$ GPa and tensile strength of 0.25 GPa. UHMWPE in contrast to the conventional high density polyethylenes having molecular weights of up to 400,000 is intractable. The polymer is supplied as fine powder and is processed into various profiles using compression molding and ram extrusion, which are known to be slow processes. Furthermore, when the ram extrusion process was used, solid state to extrude the UHMWPE and obtain a product of DR$\sim 5$, an extrusion pressure as high as 300 MPa was required, and it resulted in unstable extrusion.

This invention includes within its scope the processing of melt-crystallized, powder, and gel morphologies of semicrystalline polymers and thermotropic aromatic copolyesters. Polymer powders may be loaded into the feed reservoir and pre-compacted or compacted during the deformation process under the combined effects of extrusion pressure and a pulling load through the extrusion rolling die as shown in FIG. 8. The polymer powder is never fused by thermal treatment above the melting point of the polymer. The powder is compacted below this melting point Tm and is also solid-state deformed below Tm, in contrast to efforts to fuse the polymer powder. If, for example, a single crystal morphology of polyethylene powder were to be heated to the melting point of the polymer, it would transform to a non-single crystal morphology. In the present invention, one must stay always below the melting point of the polymer.

Polymer powder morphologies exhibit high deformability in comparison to melt-crystallized morphologies. This has been shown to be associated with the lack of molecular network between the powder particles and the type of the powder morphology. Thus, ultra-high molecular weight polyethylene powders have been compacted and extruded to a 3-5 times higher draw ratio in comparison to the maximum draw ratio achieved by extruding a melt-crystallized morphology. For example, a solution-grown ultra-high-molecular-weight polyethylene has been deformed by this invention to a draw ratio of about 50; it then had a Young's modulus of 40 GPa and a tensile strength of 0.6 GPa. Yet the single crystal morphologies of the ultra-high molecular weight polyethylene have been compacted and drawn to an even 30 times higher draw ratio by a multistep extrusion-drawing process. Such morphologies can be deformed to a draw of $\geq 150$ and have a Young's modulus of 200 GPa and a tensile strength of 3.5-4 GPa. These values are one order of magnitude higher than the values of polyethylenes drawn to the "natural" draw ratio. Similarly, polymer morphologies prepared from gels may be loaded into the feed reservoir and deformed through the extrusion rolling die. Polymer morphologies prepared from gels have high deformability because of the reduced physical entanglements in their molecular network and can be drawn to a 10 times higher draw ratio in comparison to the melt-crystallized morphologies, and they have a Young's modulus value of 100 GPa and a tensile strength of 3 GPa.

Table II below summarizes the mechanical properties of solid state deformed ultra-high molecular weight polyethylene (UHMWPE) from different morphologies.

TABLE II

| UHMWPE | Draw Ratio | Young's Modulus (GPa) | Tensile Strength (GPa) |
| --- | --- | --- | --- |
| Melt crystallized | 5-8 | 10-15 | 0.15-0.25 |
| Compound powder of of single crystals at 90° C. | 200-300 | 200-220 | 3.5-4 |
| Crystalline morphology from gel precursor | 40-50 | 100-120 | 2-4 |

Figure 19:
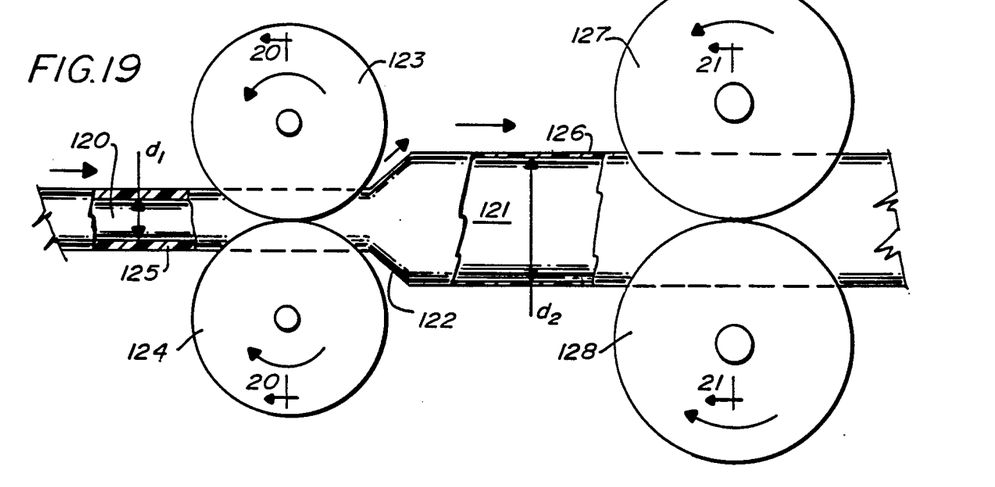
FIG. 19 is a view in longitudinal section of a device for converting thick-walled, small-diameter tubes of polymer to thinner-walled, larger-diameter tubes.
Figure 20:
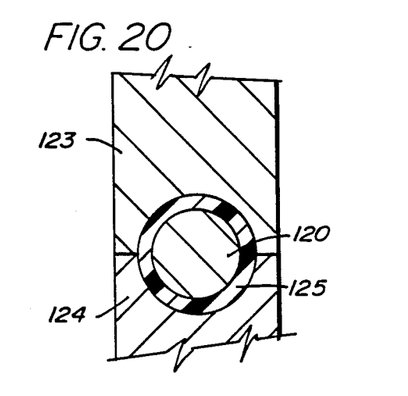
FIG. 20 is a view in cross section taken along the line 20—20 in FIG. 19.
Figure 21:
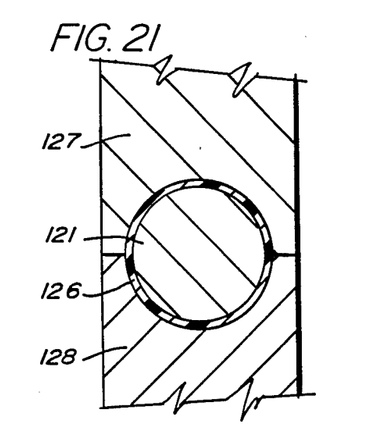
FIG. 21 is a view in cross section taken along the line 21—21 in FIG. 19.

A modification of the extrusion die described above can be used for obtaining tubular products biaxially or uniaxially deformed in the hoop direction. FIGS. 19-21 show a schematic representation of such a die modification which is comprised of a cylindrical mandrel 120 with diameter $d_1$ which is connected to a cylindrical mandrel 121 of larger diameter $d_2$, via an inverted conical region 122, and extrusion rollers 123 and 124, which provide a confined circular passage around the mandrel 120 to obtain the desired tubular profiles. When a polymer tubular stock 125 is fed on the mandrel 121, it is driven by rollers 123 on the inverted conical mandrel section 122. An expanded tube 126 is obtained; the tube 126 is deformed in the circumferential (hoop) direction. The extent of deformation, the deformation ratio, can be calculated from the ratio of the diameters of the mandrels 120 and 121 at the exit and the entrance of the die $d_2/d_2$. If tension is applied on the so expanded tube, a biaxially deformed product may result. The tension can be applied by a pulling load of the rollers 123 and 124 or an additional set of "pulling" rollers 127 and 128 may be used to provide a confining circular passage around the larger diameter mandrel 121, their rotational speed being higher than that of the rollers 123 and 124.

In a typical experiment with ultra high molecular weight polyethylene (UHMWPE), ($M_w \geq 2 \times 10^6$), a preformed tubular stock with internal diameter 0.95 cm heated at 180° C. was placed on the mandrel 120 having diameter $d_1 = 0.95$ cm preheated to 180° C. (While this may seem to be a high temperature for polyethylene, UHMWPE does not melt-flow at this temperature.) It was driven on the expanding section of the mandrel 120 by the rollers 123 and 124 to the larger diameter ($d_2 = 2.54$ cm) mandrel 121, where it was cooled to below 120° C. and retrieved. The expanded UHMWPE tubular product 126 was thus stretched in the hoop direction by ~2.7x. When such a laterally stretched tube 126 was reheated to 160° C. it shrank to practically its original dimensions, thus exhibiting remarkable elasticity. With this particular polymer, UHMWPE, higher temperatures than 180° C. can be used for its deformation using this methodology that extend well beyond 200° C. as described in U.S. Pat. No. 4,587,163. Like the uniaxially drawn UHMWPE rods which can be obtained using the extrusion-rolling die device in FIGS. 1 or 2, the laterally drawn UHMWPE tubes 126 obtained using the modified device in FIGS. 19–21 exhibit enhanced tensile properties in the lateral direction. For example, the FIGS. 19–21 drawn UHMWPE tubes 126 exhibit in the hoop direction a Young's modulus of ~2.0 GPa and a tensile strength ~150 MPa, in comparison to the Young's modulus of 0.6–1 GPa and tensile strength of ~40 MPa for the isotropic UHMWPE.

Figure 22:
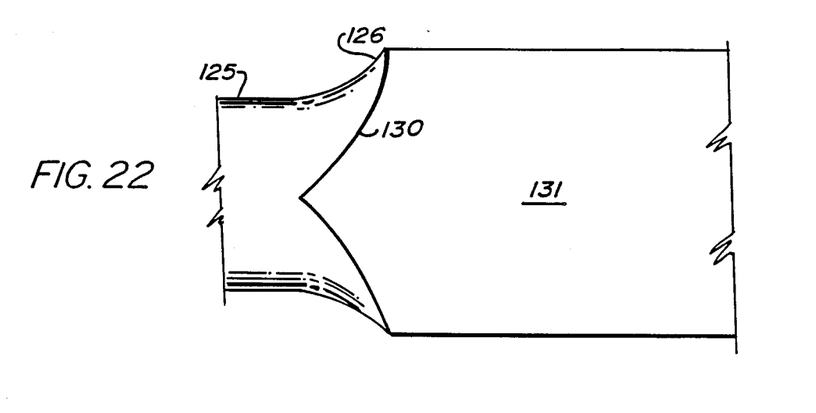
FIG. 22 is a diagrammatic view showing how the tube resulting from FIGS. 19-21 can be used to make a polymer sheet.

A tubular product 126 drawn only in the lateral direction using this processing methodology can be split along a line 130 in the machine direction into a flat sheet 131 which in a subsequent process can be stretched uniaxially by pulling or rolling to a biaxially drawn sheet. This is of advantage in comparison with the conventional rolling process in which a biaxially stretched film or sheet must be rolled first in one direction, then turned by 90° and rolled again.

This invention includes within its scope the processing of semicrystalline polymers such as polypropylene, nylons (polyamides), polyoxymethylene, poly(ethylene terephthalate), poly(vinylidene fluoride) and polymethylpentene, which are known to be deformable in the solid state and which give products of high stiffness. In the case of the rigid or semirigid polymers, polymers within the scope of this invention are the thermotropic aromatic copolyesters which may be processed at a temperature above the glass transition of the polymer and within a range near and preferably below the solid-to-mesophase transition temperature of the polymer.

The device is also useful for processing metal powder particles into thin metal profiles. Such metals as aluminum, titanium, and alloys and fiber-reinforced aluminum composite materials can be processed in this way. They may subsequently be further heat treated (e.g., sintered) in a suitable environment to increase the density and strength of the product. In this case, the straight or conical part of the extrusion-rolling die serves as the feed zone of the die device, and the rolling part serves for the compaction and deformation of the metal powder particles.

Outstanding points of the processing in this invention are:

1. It operates under moderate conditions at rapid output rates.
2. It operates under conditions of minimum friction.
3. It produces high modulus polymers of both simple and complex geometrical configurations.
4. It is a continuous process.
5. It is adaptable to commercially available polymer processes.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A method for producing high-modulus semicrystalline polymer products comprising:

Solid-state extruding a polymer having an initial polymer morphology by feeding under pressure through an extrusion-rotation die having a static entry position and a succeeding friction-reducing moving portion, said succeeding friction-reducing moving portion of said die comprising a pair of oppositely rotating members, each having integral, shaped wall surfaces strictly confining, engaging, and compressing the entire perimeter of the polymer during extrusion and providing the geometry of a die exit and a profile for extrudate which has practically the same cross-sectional area and lateral dimensions as the cross-sectional area and lateral dimensions of the die exit, said static and succeeding friction-reducing moving portions of the die having a polymer-containing zone with convergent geometry through which the polymer is compressed, oriented, and extruded under conditions of minimal friction between the polymer and the die surface for reducing the extrusion pressure, said minimal friction being obtained by substantially synchronous movement of the rotating members of the die and the polymer, said extrusion being at a temperature near but below the crystalline melting point of said polymer, to obtain an extruded polymer product having a markedly transformed morphology as compared with said initial polymer morphology, comprised of oriented and extended molecular chains and markedly enhanced tensile properties, the values of which are for the Young's modulus within the range of 2 to 220 GPa and for the tensile strength within the range of 0.15–4 GPa, and which depend upon the extent of the cross-sectional area reduction during extrusion.

2. The method of claim 1 in which the polymer is chosen from the group consisting of polyethylene, polypropylene, polyamides, polyoxymethylene, poly(ethylene terephthalate), and poly(vinylidene fluoride).

3. The method of claim 1 in which the polymer is a thermotropic aromatic copolyester and is preserved at a temperature above the glass transition thereof and near and slightly below the solid-to-mesophase transition.

4. The method of claim 3 wherein the polymer is chosen from the grup consisting of

(1)

where

-continued

R is , or

(2)

where

R is (3)

-continued (4)

5. The method of claim 1 in which said polymer is in the form of a continuous solid.

6. The method of claim 1 in which said polymer is in the form of a powder including the step of compacting said powder before introducing it to said die.

7. The method of claim 1 in which said polymer is in the form of a gel.

8. The method of claim 1 including supplying said polymer as a solid hollow tube and includes enlarging the diameter of said tube while thinning the thickness of the walls of tube.

9. The method of claim 8 including slitting the enlarged-diameter tube longitudinally to produce a sheet.

10. The method of claim 1 wherein said temperature is attained by circulating heated oil through said rotating members.

11. The method of claim 10 also including air-convection heating means for preheating the material stock just prior to entry into said extrusion-rolling die.

12. The method of claim 1 comprising a plurality of said extrusion-rotating dies and sending the extrudate from one said die to a succeeding said die.

13. The method of claim 1 wherein said method is continuous.

14. The method of claim 1 comprising performing said solid state deforming at a deformation ratio of at least 4.

* * * * *